(12) United States Patent
Argenti et al.

(10) Patent No.: US 9,880,918 B2
(45) Date of Patent: Jan. 30, 2018

(54) MOBILE AND REMOTE RUNTIME INTEGRATION

(71) Applicant: Amazon Technologies, Inc., Reno, NV (US)

(72) Inventors: Marco Argenti, Mercer Island, WA (US); Khawaja Salman Shams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/306,168

(22) Filed: Jun. 16, 2014

(65) Prior Publication Data

US 2015/0363303 A1 Dec. 17, 2015

(51) Int. Cl.
*G06F 9/44* (2006.01)
*G06F 9/45* (2006.01)
*G06F 11/34* (2006.01)
*G06F 9/48* (2006.01)
*G06F 9/50* (2006.01)

(52) U.S. Cl.
CPC ............ *G06F 11/34* (2013.01); *G06F 9/4856* (2013.01); *G06F 9/5038* (2013.01); *G06F 11/3409* (2013.01)

(58) Field of Classification Search
CPC ............ G06F 11/3612; G06F 11/3644; G06F 11/34–11/3495; G06F 9/4856; G06F 9/3409; G06F 9/5038
See application file for complete search history.

(56) References Cited

U.S. PATENT DOCUMENTS

| 8,276,140 | B1 | 9/2012 | Beda, III et al. |
| 8,296,419 | B1 | 10/2012 | Khanna et al. |
| 8,346,921 | B1 * | 1/2013 | Goodspeed ........... G06F 9/5083 709/200 |
| 8,364,154 | B1 * | 1/2013 | Raghunath et al. .......... 455/445 |
| 8,719,415 | B1 * | 5/2014 | Sirota ................... G06F 9/5061 709/221 |
| 8,984,426 | B2 * | 3/2015 | Endoh ................... G06F 9/4443 715/764 |
| 2007/0022431 | A1 * | 1/2007 | Chang ..................... G06F 9/441 719/321 |
| 2008/0228290 | A1 * | 9/2008 | Kalhoff et al. ................. 700/17 |

(Continued)

OTHER PUBLICATIONS

Cong Shi, Serendipity: Enabling Remote Computing among Intermittently Connected Mobile Devices, 2012, pp. 1-10. http://dl.acm.org/citation.cfm?id=2248394.*

(Continued)

*Primary Examiner* — Thuy Dao
*Assistant Examiner* — Mongbao Nguyen
(74) *Attorney, Agent, or Firm* — Baker & Hostetler LLP

(57) ABSTRACT

An application program may be analyzed to identify candidate classes or methods that may be executed using a remote computing node. Candidate classes or methods may be translocated to the remote computing node based on performance characteristics of the device on which the application program is running, the environment in which the device operates, and on the performance and availability of the remote computing node. An application program publisher may be assigned instances of virtual machines that may be dedicated to hosting translocated classes and methods.

18 Claims, 10 Drawing Sheets

(56) References Cited

U.S. PATENT DOCUMENTS

| | | | |
|---|---|---|---|
| 2009/0022118 A1 | 1/2009 | Behzad et al. | |
| 2009/0271784 A1 | 10/2009 | Barsness et al. | |
| 2009/0271799 A1 | 10/2009 | Barsness et al. | |
| 2009/0276771 A1* | 11/2009 | Nickolov | G06F 9/4856 717/177 |
| 2010/0121904 A1 | 5/2010 | Karo | |
| 2010/0318999 A1 | 12/2010 | Zhao et al. | |
| 2011/0066470 A1* | 3/2011 | Goyal | G06F 17/30899 705/7.14 |
| 2011/0066727 A1* | 3/2011 | Palmer | H04L 67/1008 709/224 |
| 2011/0078378 A1* | 3/2011 | Suzuki | G06F 9/445 711/118 |
| 2011/0078411 A1* | 3/2011 | MacIinovsky | G06Q 10/06 712/30 |
| 2011/0099534 A1* | 4/2011 | Hakamata | G06F 9/45516 717/110 |
| 2011/0154350 A1* | 6/2011 | Doyle et al. | 718/104 |
| 2011/0173644 A1* | 7/2011 | Teng | G06F 3/1415 719/329 |
| 2011/0231469 A1* | 9/2011 | Wolman | G06F 9/5094 709/201 |
| 2012/0240112 A1* | 9/2012 | Nishiguchi | G06F 9/45558 718/1 |
| 2013/0073600 A1 | 3/2013 | Jenkins et al. | |
| 2013/0080805 A1 | 3/2013 | Vick et al. | |
| 2013/0191606 A1* | 7/2013 | Goldberg | G06F 11/2082 711/162 |
| 2013/0227558 A1 | 8/2013 | Du et al. | |
| 2013/0247049 A1* | 9/2013 | Aoki | G06F 9/44 718/100 |
| 2013/0290901 A1* | 10/2013 | Yarita | G06F 3/04886 715/810 |
| 2013/0339935 A1* | 12/2013 | Melamed | G06F 9/5044 717/153 |
| 2014/0095682 A1* | 4/2014 | Yablokov | 709/223 |
| 2014/0123299 A1* | 5/2014 | Jung et al. | 726/26 |
| 2014/0149584 A1* | 5/2014 | Hwang | 709/224 |
| 2014/0164632 A1* | 6/2014 | Kim et al. | 709/227 |
| 2014/0181183 A1* | 6/2014 | Houjou | H04M 1/7253 709/203 |
| 2014/0229526 A1* | 8/2014 | Saib | G06F 9/547 709/203 |
| 2015/0046393 A1* | 2/2015 | Kamal | G06Q 10/103 707/617 |
| 2015/0121434 A1* | 4/2015 | Shimizu | H04N 21/42204 725/80 |
| 2015/0169616 A1* | 6/2015 | Benraz | G06F 17/30283 714/798 |

OTHER PUBLICATIONS

Oracle, Oracle Mobile Suite, 2013, pp. 1-6. http://www.oracle.com/us/technologies/mobile/oracle-mobile-suite-ds-2085011.pdf.*

Massimo Marchi, Specification and execution of policies for Grid Service Selection, 2004, pp. 1-2 http://ieeexplore.ieee.org/document/1314961/.*

Bun et al.; "Clonecloud: Elastic Execution between Mobile Device and Cloud"; Proceedings of the Eurosys 2011 Conference; Apr. 2011; p. 301-314.

Flinn et al.; "Self-Tuned Remote Execution for Pervasive Computing"; IEEE Proceedings of the 8$^{th}$ Workshop—Hot Topics in Operating Systems; May 2001; p. 61-66.

International Patent Application No. PCT/US2015/035848; Int'l Search Report and the Written Opinion; dated Oct. 14, 2015; 12 pages.

Katyal et al.; Application of Selective Algorithm for Effective Resource Provisioning in Cloud Computing Environment; Int'l Journal on Cloud Computing: Services and Architecture; vol. 4 No. 1; Feb. 2014; 10 pages.

International Patent Application No. PCT/US2015/035848; Int'l Preliminary Report on Patentability; dated Dec. 20, 2016; 7 pages.

"Computer System." Business Dictionary. N.p., Jun. 24, 2013. Web. Apr. 5, 2016. <https://web.archive.org/web/20130624153829/http://www.businessdictionary.com/definition/computer-system.html>. 2 pages.

"Fork (system call)." Wikipedia. N.p., Sep. 20, 2013. Web. Apr. 12, 2016. https://web.archive.org/web/20130920070123/http:/len.wikipedia.org/wiki/Fork_(system_call); 6 pages.

* cited by examiner

MOBILE AND REMOTE RUNTIME INTEGRATION

CROSS-REFERENCE

This application is related to co-pending application entitled "MOBILE AND REMOTE RUNTIME INTEGRATION", U.S. application Ser. No. 14/306,173, filed on Jun. 16, 2014, which is hereby incorporated by reference in its entirety.

BACKGROUND

Traditional methods of distributing workload between client devices and remotely located computing resources may rely on defined interfaces between programs executing on client devices and services provided by remote computing facilities. A program executing on the client might, for example, be designed to include instructions for invoking calls to various methods of a pre-defined set of web services. Similarly, web services might be designed to provide a specific set of functionality that was considered, at design time, to be best performed by a service running at a remote computing facility, rather than performed by a client device. In other words, the boundary between a program executing on a client device and remote computing resources is set at design time. The boundary may be set based on various assumptions, such as the capabilities of the client device and the availability of the remote computing resources. These assumptions, however, may change over time.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1A:
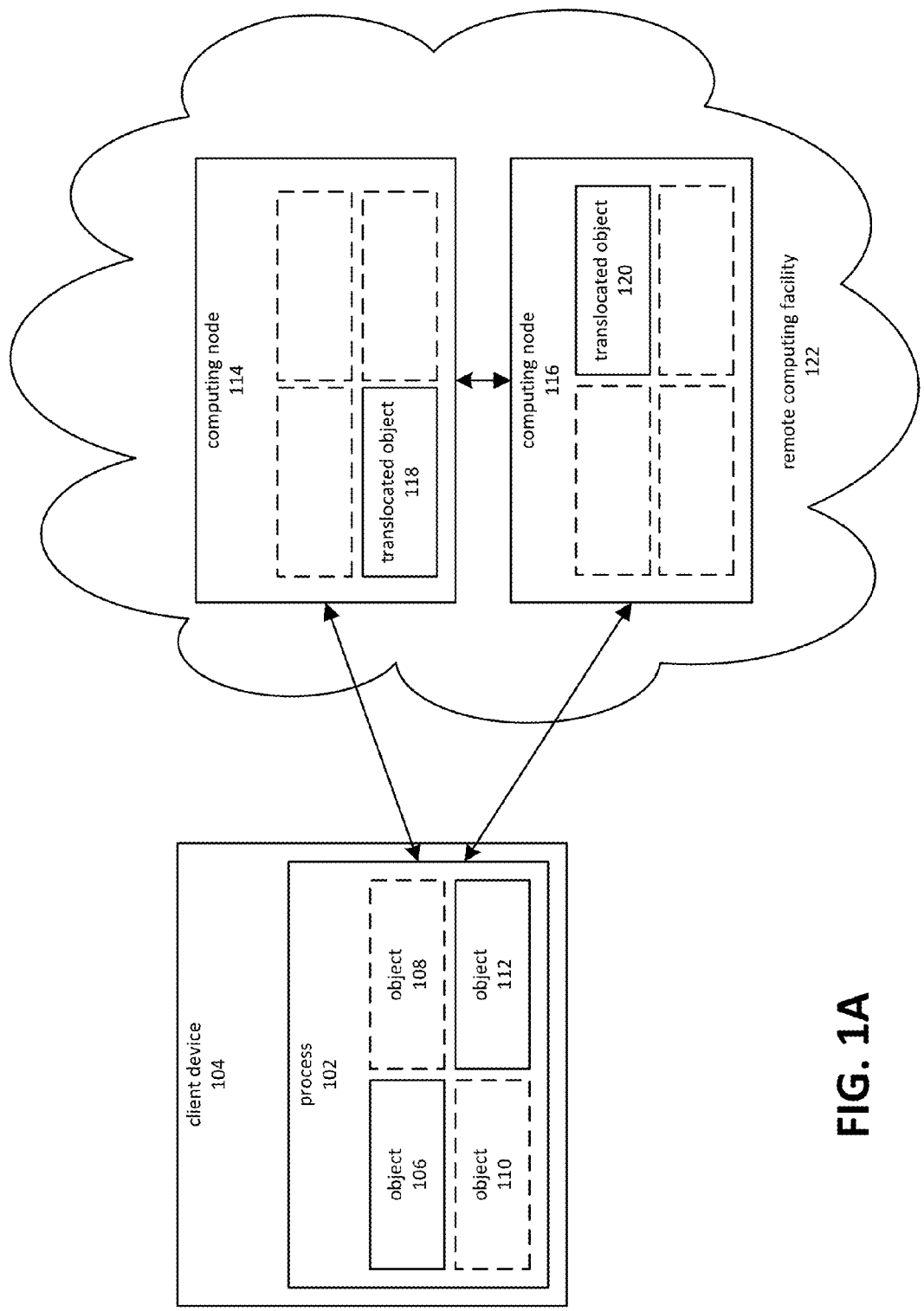
FIG. 1A depicts an example of a system for performing a distributed execution of a program developed using a unified paradigm for developing applications that leverage remote computing facilities.

Various forms of mobile phones, tablets, game consoles, personal computers and other consumer-oriented computing devices may have considerable computing power. However, the capabilities of any one of these devices are limited by the device's built-in hardware. Developers may write application programs that are tailored for the least powerful types of devices. This approach, however, limits the capabilities of the application programs and underutilizes the capabilities of the device. Developers may also write application programs that scale up to the capabilities of the device on which they are run. This approach may make better use of the device's hardware, but may also increase the complexity and cost of developing the application program.

An alternative approach may involve utilizing scalable computing resources, such as remote computing facilities, sometimes referred to as cloud computing. A remote computing facility may contain some number of computing resources that may be leveraged by a client device, which may include the mobile phones, tablets, game consoles, personal computers described in the preceding paragraph. Various approaches to interacting with remote computing facilities have been employed. These include, for example, remote procedure calls, web services, representational state transfer ("REST") protocols and so on. All of these approaches involve some sort of explicit determination, on the part of the developer, that a particular aspect of an application's functionality should be performed by a remote computing device. Accordingly, although these approaches may provide application programs with capabilities beyond those provided by the client device, the extent to which the remote computing facilities are leveraged may depend exclusively upon the foresight of the developer.

Another aspect of these approaches, such as remote procedure calls, web services, REST interfaces and so forth, is that they involve separate programming paradigms or methodologies that are different from those used in the remainder of an application program. In order to interact with a remote computing device, a developer writes specialized code for interacting with the remote computing device. For example, a developer might write code that formats parameters to a REST interface call in uniform resource locator ("URL") format. The developer might also write code to explicitly invoke the REST interface by making a hypertext transfer protocol ("HTTP") request. This method of interaction with the remote service is dissimilar to the methods of interacting with code that is local to the device on which the application program is to be run. In order to invoke functions being performed locally, a developer may use syntax that is conventional for the language in which the application program is being written.

Aspects of the present disclosure may be employed, in various embodiments, to enable a unified paradigm for developing application programs that leverage the capabilities of remote computing facilities. Aspects of the present disclosure may also be employed, in various embodiments, to dynamically adjust the degree to which remote computing facilities are leveraged.

Figure 1B:
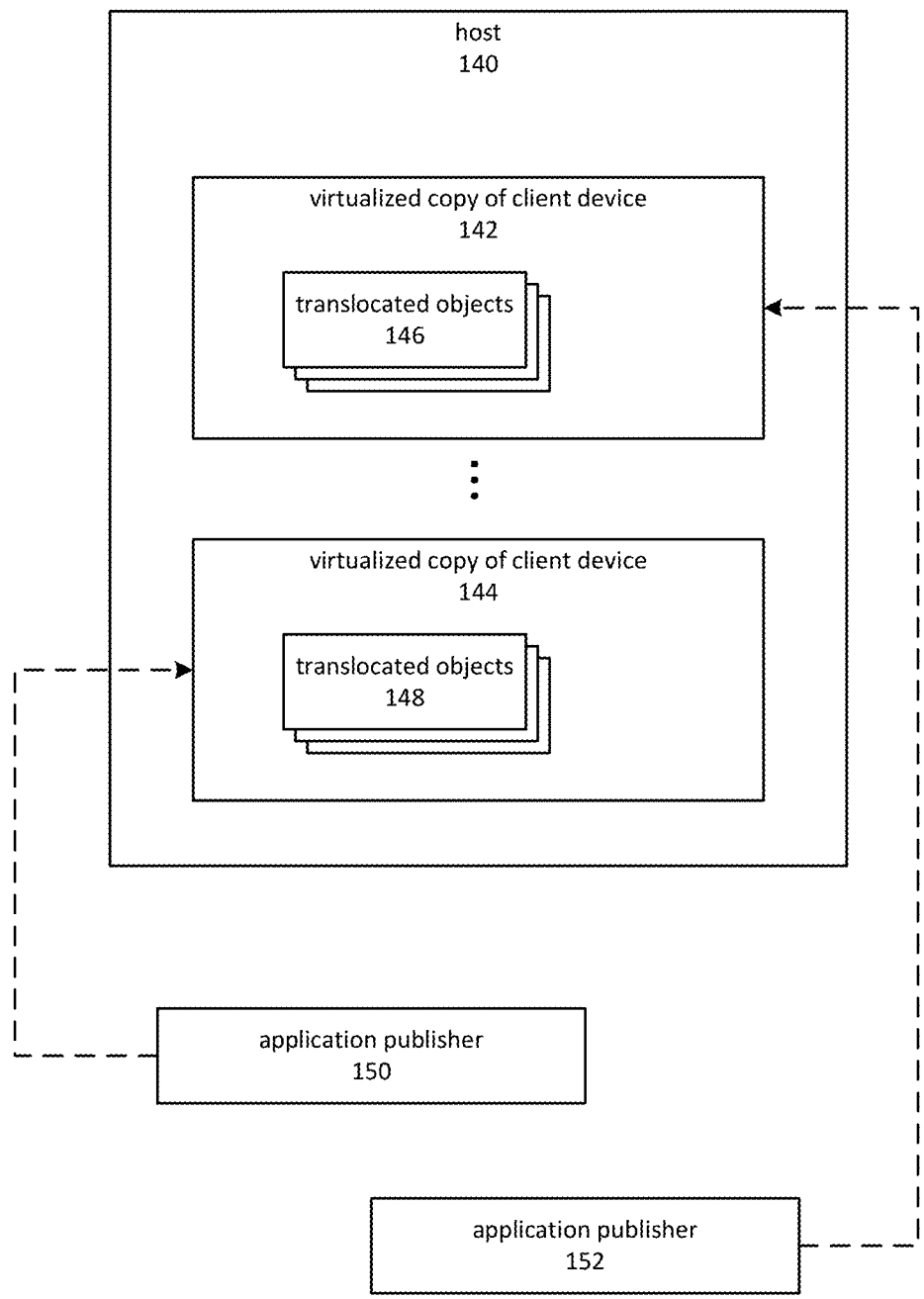
FIG. 1B is a block diagram depicting an embodiment of allocating cloud-based computing resources to an application program on behalf of application publishers.

FIGS. 1A and 1B depict examples of a system for performing a distributed execution of a program developed using a unified paradigm for developing applications that leverage remote computing facilities.

As used herein, the term application program may refer to stored instructions, including executable files, dynamic link libraries, static link libraries and so forth. The term application program may also refer to source code, text files and so forth, as well as intermediate instructions, byte code and other forms of stored instructions. The term application program may refer to a set of one or more files related to implementations of various computing applications. A copy of an application program (e.g. the one or more related files) may be downloaded to a client device and stored thereon. A second copy may be stored on a remote computing device on which translocated classes or methods may execute. As used herein, the term translocation may refer to executing some portion of an object or function remotely. Although in some cases and embodiments translocation may involve relocation of an entire object, in other cases only part of an object may be translocated. Embodiments may employ various techniques for minimizing data transfer required to perform translocation, and accordingly may in some cases transfer an amount of data necessary to remotely execute a selected method or set of methods, rather than transferring all of the data associated with an object.

An application program may comprise a number of classes. A class may comprise one or more methods and may also comprise one or more pieces of associated data. A method may have one or more input parameters and may also have one or more return values and/or output parameters. A method may contain instructions that utilize data associated with the class as input and/or output. As used herein, the terms method and function may be used interchangeably. The terms method or function may be used to refer to procedures associated with a particular class, or to standalone procedures that are not associated with any particular class.

When an application program is executed, it may be referred to as an instance of an application program or as a process. Instances of the classes that comprise an application program may be referred to as objects. An instance of a class may be associated with a region of memory in which data associated with the class is stored.

FIG. 1A depicts a client device 104 on which an instance of an application program, process 102, is running. The process 102 may comprise a number of class instances, such as the depicted objects 106, 108, 110 and 112. At various points in execution, each instance of objects 106, 108, 110 and 112 may be executing on client device 104. However, certain objects may be selected for translocation to a remote computing node. For example, FIG. 1A depicts object 110 as being translocated to computing node 114, where it executes as translocated object 118, and object 108 as being translocated to computing node 116, where it executes as translocated object 120. Translocating an object may comprise executing one or more methods of the object on a computing device other than the device on which the object is initially instantiated. Objects may also be translocated prior to instantiation by initially creating the object on a remote computing node, such as computing nodes 114 or 116. Embodiments may also perform as-needed instantiation of a translocated object on either end of a translocation. For example, an object might initially be instantiated on a client device and then instantiated on a remote computing node just prior to remotely performing a method of the object on the remote computing node. In some cases, invocation of a function or object method may not depend on any instance variables or other object state, in which case instantiating the object may be a "no-op" or may be skipped. An object might also be partially instantiated, for example by initializing only those memory locations to be accessed by a translocated method.

Computing nodes 114 and 116 may be hosted within a remote computing facility 122. In some embodiments, remote computing facility 122 may be operated by a provider on behalf of application publishers. Use of remote computing facility 122 may involve various costs charged to the application publisher in return for the provision of computing power to the publisher's applications. This may be one factor used in determining the extent to which objects are translocated to remote computing nodes, among many possible factors that may be employed individually or in combination. For example, a publisher with a large budget might allow a number of computing nodes to be used by application programs running on client devices in order to improve application performance. Alternatively, a publisher with a small budget might restrict usage to a minimum level. In some cases, however, the publisher might want to temporarily allow a greater number of objects to be translocated to remote computing devices at a facility, such as remote computing facility 122.

In various embodiments, objects may also be translocated based on factors, such as performance and network conditions. For example, an object executing on computing node 114 might be translocated to computing node 116 based on the latter being less heavily utilized. In some cases and embodiments, an object might be translocated back to client device 104 after a period in which it was executing on a remote computing node, such as computing nodes 114 or 116. This might occur, for example, when network connectivity between client device 104 and remote computing facility 122 is interrupted.

Embodiments may determine the suitability of a class for translocation based on a variety of factors involving both the class and its dependencies. This may include other classes on which the candidate for translocation depends, static or dynamic link libraries, background services, operating system ("OS") functions and hardware. In addition, data associated with the class, such as member data and method parameters, may influence the suitability of a class for translocation.

Candidates for translocation may be identified by a software developer. For example, a developer may employ annotations, attributes or other development language features to mark candidates for translocation. This information may be processed by a compiler, interpreter and/or linker and may be included in an executable program or library. Embodiments may perform static analysis of the translocation candidates to make an initial estimate of the viability of translocating instances of the candidate classes. Accordingly, in some embodiments the marking of a class as a candidate for translocation may be suggestive of translocating the class, but may not necessarily be determinative. An initial estimate of the viability may be determined by analyzing dependencies and modes of interaction of a candidate class.

Embodiments of the present disclosure may be employed to publish applications for use on various client devices and to provide flexible computation environments for the published applications. For example, an application publisher might publish an application program for which certain methods or classes have been marked as candidates for translocation. The application publisher might also reserve cloud-based computing resources so that some portion of the application program may be run on computing nodes remote to the client devices that download the application program. For example, an application publisher might release a single copy of a game program that may run on smartphones with relatively low computing power and tablets with relatively high computing power. Instances of a game running on a smartphone might make greater use of the reserved cloud-based computing resources, while instances of a game running on tablets might make less use. The application publisher might adjust the amount of reserved cloud-based computing resources, where the adjustment is based on the proportion of mobile phones to tablets.

Embodiments may utilize aspects of the present disclosure to relocate execution of background tasks. Methods or classes in an application may, for example, be marked as subject to conditional translocation in response to events such as system startup or shutdown. At runtime, these methods may be translocated. This approach may be employed in conjunction with a background task running on a client device. When the client device shuts down, a shutdown event may trigger translocation of a background task to a remote computing node, where it may continue to execute while the client device is shut down. When the client device starts up again, execution may continue on the client. State information for the background task may be transferred with each translocation. This may allow for a background task to be long-running, even when a client device shuts down or suspends execution of a local background task. Another example may involve performing translocation in order to save power. For example, a background task might be translocated to a remote computing device when an application that uses it is not in the foreground. When that application becomes a foreground application, execution might resume locally.

FIG. 1B is a block diagram depicting an embodiment of allocating cloud-based computing resources to an application program on behalf of application publishers. A provider may maintain a host 140, which may include one or more computing devices. An application publisher 150 might be associated with virtualized copy of client device 144 in conjunction with publishing an application for downloading to various clients. Although FIG. 1B depicts a one-to-one relationship between application publisher 150 and virtualized copy of client device 144, many other combinations are possible. For example, application publisher 150 might reserve one virtualized operating system per application program, or it might reserve a number of virtual machines to be utilized by a number of application programs. Translocated objects 148, related to one or more applications published by application publisher 150, may operate in the context of virtualized copy of client device 144.

A second application publisher 152 might reserve a virtualized copy of client device 142, which may operate on the same host 140 as virtualized copy of client device 144. Translocated objects 146, related to one or more applications published by application publisher 152, may operate in the context of virtualized copy of client device 142.

A virtual machine may be selected or configured as a virtualized copy of a client device 142. A virtualized copy of a client device 142 may have characteristics similar to those of a client device on which an application program is running. In some cases and embodiments, both of these environments may be equivalent in the sense that an application program operating on a client device would operate in substantially the same manner as the same application program operating on a remote computing node. More generally, embodiments may utilize, for executing translocated classes and methods, a copy or equivalent of an environment used on a client device for executing an application.

As used herein, the term virtual machine may pertain to software-based emulation of a computer, such as those operating under the control of a hypervisor or similar process. The term virtual machine may also pertain to executable processes for performing intermediate-level (i.e., non-processor specific) instructions, such as a JAVA virtual machine. A virtualized copy of a client environment may, in various embodiments, comprise any of these types of virtual machines.

Embodiments may perform various operations to maintain compatibility between environments in which translocatable processes operate. This may comprise maintaining consistency between an execution environment for a process on a client device and an execution environment for translocated classes or methods on a remote computing node. For example, in FIG. 1A process 102 might execute on a JAVA virtual machine running on a version of the LINUX operating system. Computing nodes 114 and 116 might be instantiated or reserved based on their running on the same version of the LINUX operating system and using the same version of the JAVA virtual machine.

Figure 2:
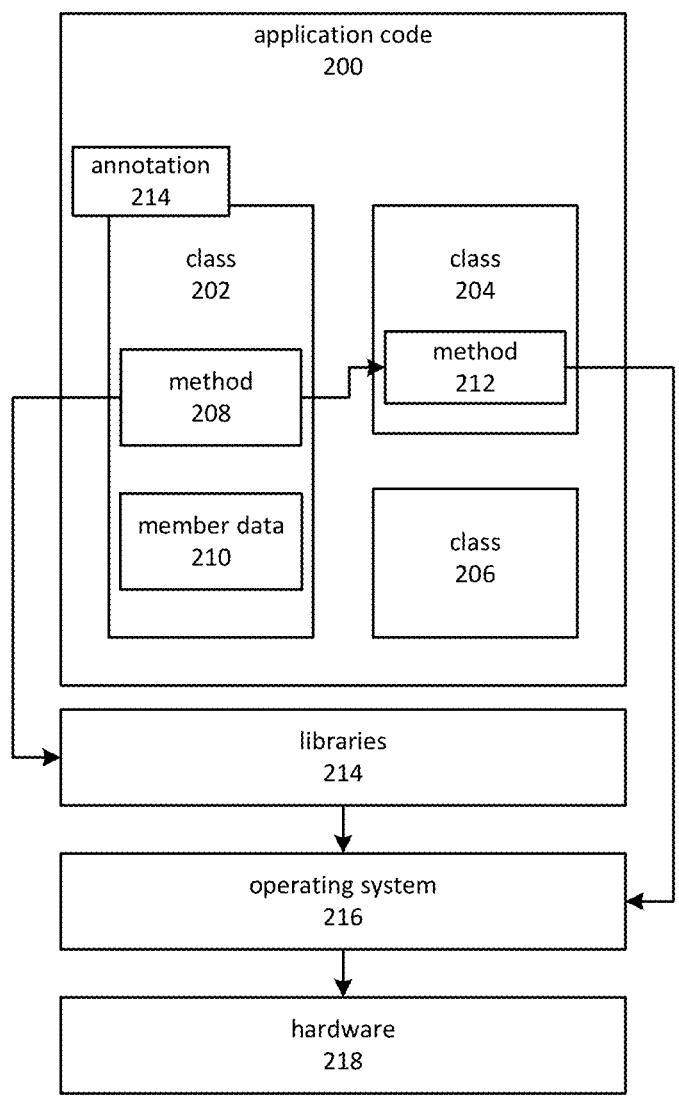
FIG. 2 is a block diagram depicting an application program prior to compilation, where at least one class or method in the application program has been annotated to indicate potential for translocation.

FIG. 2 is a block diagram depicting an application program prior to compilation, where at least one class in the application program has been annotated to indicate potential for translocation. Application code 200 may comprise various source files defining a number of classes, such as classes 202, 204 and 206. Each class may comprise one or more methods and may also have one or more pieces of associated data, sometimes referred to as member data. For example, class 202 might comprise method 208 and member data 210, and class 204 might comprise method 212.

The developer (not shown) may provide an annotation 214 for class 202 to indicate that class 202 should be treated as a candidate for translocation. Any number of classes within application code 200 may be annotated as candidates for translocation. However, for simplicity of representation FIG. 2 depicts only one annotated class.

The viability of translocating annotated class 202 may depend on its dependencies. For example, method 208 of class 202 may be dependent on method 212 of class 204 and on one or more of libraries 214. Dependency may be direct or indirect. For example, method 208 might contain code invoking method 212, and may therefore be directly dependent on method 212. Method 208 might also invoke or rely on functions or features of one or more libraries 214. Method 208 might be indirectly dependent on certain functions of operating system 216 due to method 212 invoking those functions. Various dependencies might also exist between the one or more libraries 214, operating system 216 and hardware 218.

Translocating an object may comprise synchronization of various code elements between a client device and one or more remote computing nodes, or between one or more remote computing nodes. Aspects of synchronization may involve operating system versions, library versions, and application versions. In general, this may involve synchronizing the stored executable instructions corresponding to the operating system, library or application. For example, a client device may operate under version X.Y of operating system Z. An instance of operating system Z may be operated on a remote computing node. The remote computing might use an operating system that is determined to be equivalent to version X.Y. In this context, equivalence may be determined with respect to the functionality on which it is dependent. For example, in FIG. 2, method 212 might depend upon a component of operating system 216 that was not affected by an upgrade from a previous version of operating system Z to version X.Y. In this case, the previous version and version X.Y may be deemed equivalent and, based on the equivalence, also deemed to be synchronized. Libraries and application program code may be synchronized based on this form of equivalence.

Translocating an object may also comprise synchronizing data elements. In various embodiments, data stored by an application may be synchronized, so that a translocated object may have direct access to the data on which it relies. Embodiments may also synchronize in-memory data. Using FIG. 2 as an example, class 202 may comprise member data 210. This data may be used by method 208 as well as additional methods, not depicted, of class 202. Accordingly, some embodiments may perform data synchronization of member data 210 between a client device and one or more remote computing nodes, or between two or more remote computing nodes.

Figure 3:
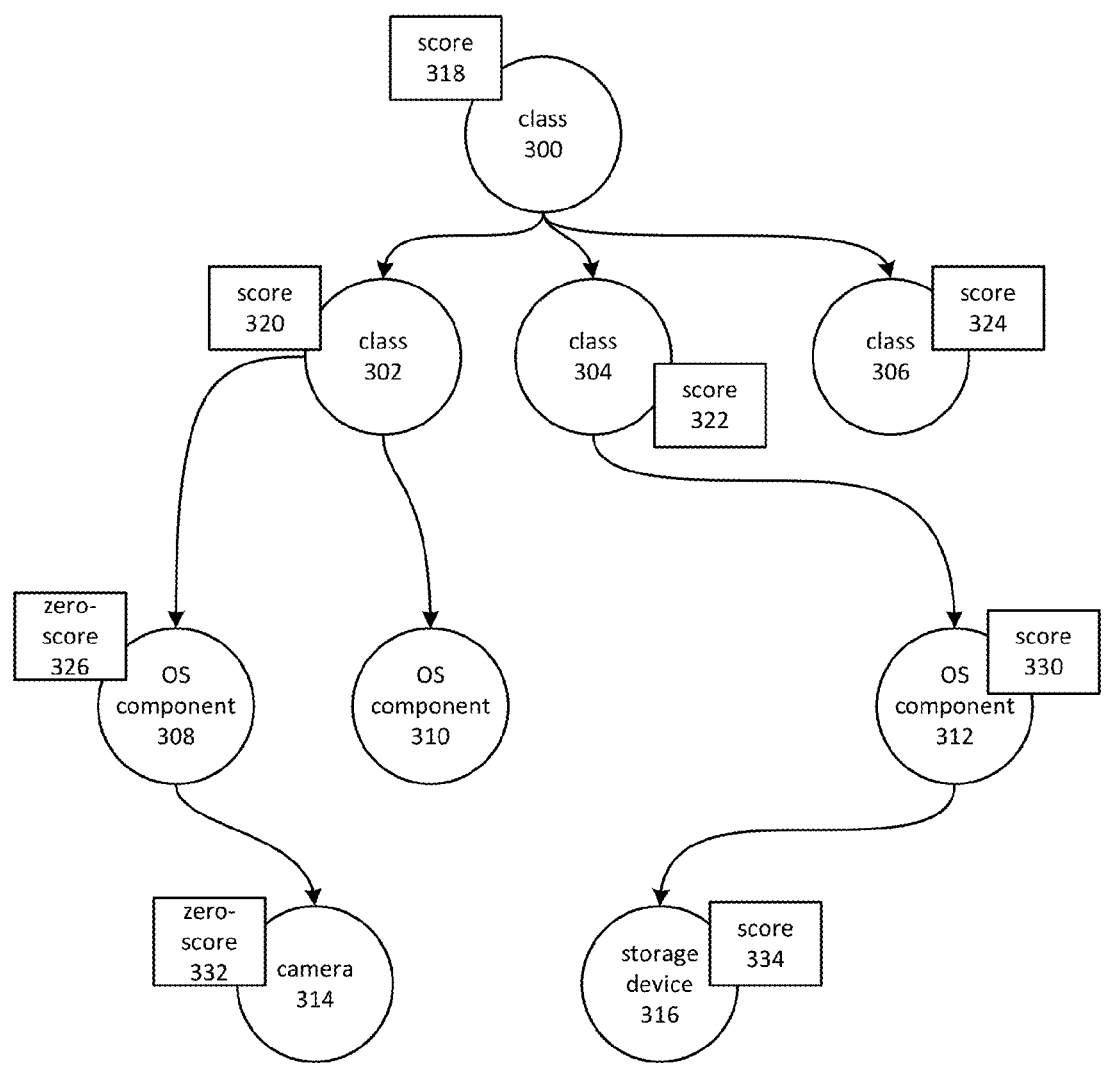
FIG. 3 is a diagram depicting a process for performing static analysis of class or method dependencies in order to determine suitability of a class or method for translocation.

FIG. 3 is a diagram depicting a process for performing static analysis of class dependencies in order to determine suitability of a class translocation. A tree structure may be used to store representations of various classes 300-306 of a program. The tree structure may be formed by various means, such as parsing or reflection of source or compiled code elements. In FIG. 3, class 300 may be dependent on classes 302, 304 and 306. The suitability of instances of class 300 for translocation may depend on the suitability for translocation of instances of the classes on which class 300 depends.

A variety of factors may influence suitability for translocation. These include, but are not limited to, the following example factors. One factor may involve suitability for translocation, which may be affected by the computational demands imposed by the class method or methods that may be translocatable. Computational complexity may be analyzed based at least in part on comparison with the computational abilities of local devices as compared to remote computing nodes that may be available at the time of execution. A second factor may involve the size of parameters to methods of the class that may be translocated. Methods with no parameters, or those whose parameters are small, may be more suited to translocation than those with many parameters or parameters that are large. A third factor involves member variables, global variables, and other data referenced by the methods of the class that may be translocated. Methods dependent on a small amount of such data may be more suitable for translocation than methods dependent on a large amount of such data. A fourth factor involves the degree of interdependence between state information, such as member variables and global variables that may be affected during invocation of a method. For example, methods that are stateless may be more suitable for translocation than methods that are not. Similarly, methods affecting only member variables may be more suitable for translocation than a method that affects a global variable, particularly if a number of additional methods are also dependent on the global variable.

Some classes may contain methods that invoke operating system components. For example, FIG. 3 depicts class 302 being dependent on OS components 308 and 310, and class 304 being dependent on OS component 312. Certain operating system functions may conflict with the translocation of a class or method. For example, in FIG. 3, OS component 308 is depicted as being dependent on camera 314. Because the camera local to the client device is the intended target of such functions, they should not be translocated, except for certain situations such as testing or device simulation. In other cases, operating system functions may involve functions such as local memory management, power-off or other aspects of local functionality, which should not be translocated. Some devices, however, may be suitable for translocation. In FIG. 3, storage device 316 may be suitable for translocation. Embodiments may support translocation of storage devices through various techniques, such as synchronizing the contents of local device storage and remote device storage.

A score may be assigned to classes and methods in a program that assign an initial estimate of the class or method's suitability for translocation. Embodiments may assign a high score to classes that should have the highest priority for translocation, and assign low scores to classes that should have low translocation priority or should not be translocated. Embodiments may assign a score to a class based on the scores assigned to the classes and other elements, such as OS components and hardware on which the class depends.

In the example of FIG. 3, class 300 might not be a good candidate for translocation due to its indirect dependence on camera 314 with zero-score 332, through class 302 with score 320 and OS component 308 with zero-score 326. This may be reflected by a low priority for translocation, which may be reflected in a low value for score 318 being associated with class 300.

In some embodiments, class 300 could still be translocated by arranging for calls to OS component 308 to be performed on the local device. The flow of control in such cases may switch between a client device and a remote computing device as needed. Embodiments may utilize factors such as the chattiness of the interface, the amount of data transferred and so forth when assigning In some cases and embodiments, a class may be assigned a high score even though a dependent class, OS component or device receives a low score. This may occur due to various factors, such as the interface between a high scoring class and a low scoring class, OS component or device being amenable to the translocation of the high scoring class. This may be the case, for example, when the benefits of running on the remote location are high compared to the drawbacks. This may be the case when the frequency of interaction between the high scoring class and the low scoring class, OS component or device is relatively low. For example, a class that performs a lengthy series of complex computations might benefit from translocation, even if it performs some functions that cannot be translocated. In this case, it may be beneficial to translocate the class despite the cost of context-switching to execute the non-translocated functions. This cost might comprise factors such as transferring data between a client device and a remote computing node, locating a corresponding process on the appropriate remote computing node and so on.

In some cases and embodiments, scores may be assigned to a class or method based on alternative factors such as an intent to allow redirection of all methods or classes corresponding to a particular category. For example, all of the functions belonging to an API might be marked as candidates for translocation. A tentative or conditional score might be used in this context. For example, at runtime a determination might be made to execute a version of an API which is available at a remote location but not on the client.

An embodiment might also assign scores to a class or method based on the class or method invoking, directly or indirectly, an external API. The score may be further based on a cost of invoking the API, where cost may refer to various factors such as data transfer costs, bandwidth utilization and so forth. For example, a candidate for translocation might invoke an Internet-based web service. If performed on a mobile device, invoking the web service might involve the user of the mobile device incurring usage charges based on the amount of data transferred. By translocating the class or method that invokes the web-service, those charges might be avoided.

Embodiments may assign a score 322 to class 304 based on the scores 330 and 334 assigned to OS component 312 and storage device 316. A score assigned to devices, such as score 334 assigned to storage device 316, may depend on a number of factors, such as the intent of the developer and the compatibility of the device with translocation. For example, a developer may indicate that a certain class is intended to use a remotely located storage device; the indication may be made through a mechanism such as annotations or attributes. Accordingly, in such circumstances the indirect dependency of class 304 on storage device 316 would be a factor in assigning a favorable score to class 304. In other words, a score 322 or class 304 could be influenced by score 330 and score 334.

A class with no dependencies, such as class 306, may receive a high translocation score, depicted in FIG. 3 as score 324. A score 324 may be influenced by various additional factors, such as an indication provided by the developer that the class should be preferred for translocation. The indication may be provided, for example, through annotation of a class or method that indicates a developer's belief in the suitability for translocation of the class or method.

In some embodiments, scores indicating priority for translocation may be set by static analysis, as described in conjunction with FIG. 3, and adjusted by monitoring execution during runtime. In other embodiments, static analysis may be used to identify candidates for translocation but scoring may be deferred until runtime. In such cases, a score assigned to a class during static analysis may be used as a basis for setting initial scores on objects. In various embodiments, different objects of the same class may have different scores. This might occur, for example, based on different objects of the same class having different characteristics, such as size. A smaller-sized object might, for example, be a better candidate for translocation than a larger object.

Embodiments may also employ multiple score sets to be employed conditionally, for example one set of scores to be used if the application is run on a mobile device and another to be used if the application is run on a personal computer. Scores assigned to object instances may be selected from a set of possible scores associated with a class, based in part on factors such as the client device's configuration or the environment in which the client device is operating.

Figure 4:
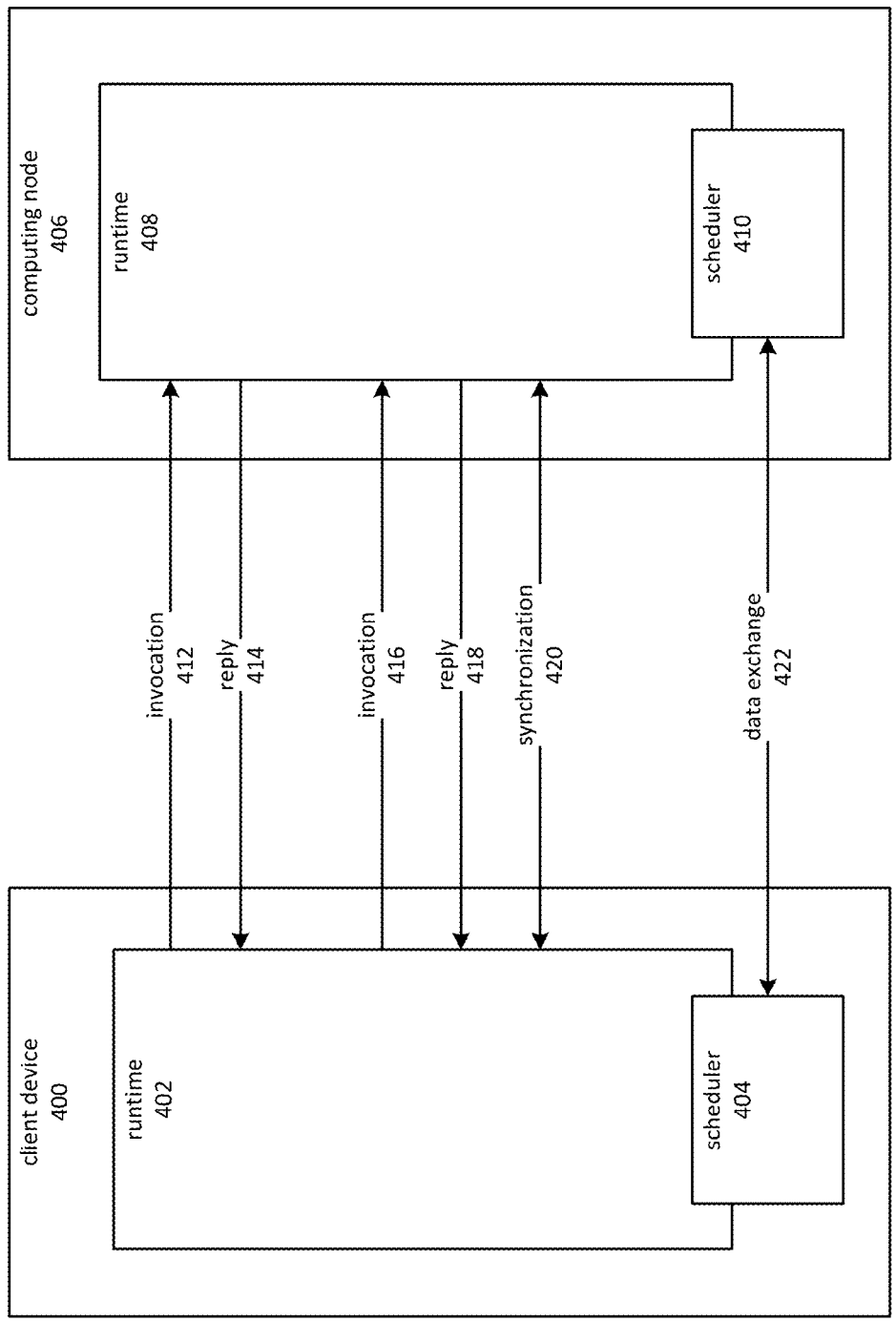
FIG. 4 is a diagram depicting monitoring and translocation of classes or methods in an executing program and invocation of stateless and stateful methods.

FIG. 4 is a diagram depicting the monitoring and translocation of classes in an executing program and the invocation of stateless and stateful methods. An application program may be executed on a client device 400. Application programs may run using a runtime 402. In some embodiments, runtime 402 may comprise instructions for translating intermediate language instructions or bytecode instructions to processor instructions, and for executing the translated instructions. A runtime 402 may also comprise a virtual computing environment.

One or more scheduler 404 modules may execute on client device 400. The term module may refer to various combinations of computer-executable instructions and circuitry for performing an aspect of the present disclosure. A module may include static and dynamic link libraries, executable programs, operating system components and so on. Scheduler 404 module may perform operations including tracking performance characteristics of client device 400, runtime 402 and the performance of the application program. In various embodiments, instructions for monitoring and translocation may be included in one or more modules, each containing a subset of instructions for performing various aspects of the present embodiments. Although FIG. 4 depicts monitoring and translocation functions performed by a single module, the depiction should not be viewed as limiting the embodiments to using a single module or as preventing operations described herein from being incorporated into other elements, such as a runtime or operating system.

Scheduler 404 module may perform the monitoring of data transfer between class and method boundaries. Embodiments may utilize data transfer characteristics as a factor in determining to translocate an object. A relatively low amount of data transfer between a class or method boundary may be indicative of translocating an object, while a relatively high amount of data transfer may contraindicate translocation.

Scheduler 404 module may perform operations that identify translocation candidates. Candidates may be identified based on various factors, including information included in or associated with the application program identifying potential candidates. This information may be embedded in an application program or written to an associated file that may be read by a scheduler 404 module. For example, embodiments may scan an application program upon the application program's startup to identify any translocation candidates. In some embodiments, translocation candidates may be identified after the application program's startup. Embodiments could, for example, determine if a class is marked as a translocation candidate just prior to an instance of the class being instantiated.

Scheduler 404 may utilize information collected during monitoring to select a class for translocation. Embodiments may select the class from among classes identified as candidates. The selection may be based on scores assigned to the candidate classes based on static analysis. The selection may also be based on adjusted scores, where the scores are adjusted based on monitored information. For example, static analysis might indicate that a class is a good candidate for translocation, while monitoring the class may indicate that it transfers large amounts of data between boundaries. An embodiment might, in this case, reduce the translocation score assigned to the class to indicate an adjusted priority for translocation.

In some cases and embodiments, the performance of client device 400 or runtime 402 might be indicative of adjusting the scores of some classes to indicate that they should receive greater priority for translocation. For example, when the central processing units ("CPUs") of client device 400 are overloaded, classes placing greater demands on the CPU might be prioritized for translocation over classes that place fewer demands on the CPU.

Translocated classes may execute on computing node 406. A runtime 408 may be employed on computing node 406. Embodiments may match operating characteristics of runtime 402 operating on client device 400 with characteristics of runtime 408 operating on computing node 406. For example, computing node 406 may operate a runtime 408 whose version is compatible with the version of runtime 402 operating on the client.

A scheduler 410 module may operate on computing node 406. The scheduler 410 module on computing node 406 may perform operations similar to those performed by scheduler 404 operating on client device 400. These operations may include monitoring various aspects of the performance of computing node 406 and runtime 408. A communications path, referred to using the data exchange 422 arrow in FIG. 4, may be established between scheduler 404 operating on client device 400 and scheduler 410 operating on computing node 406. Information shared between schedulers 404 and 410 may be used to select classes for translocation from client device 400 to computing node 406, and to end the translocation of selected classes. For example, an embodiment might monitor CPU utilization of computing node 406 and determine that it is being utilized too heavily, or that it is being utilized more heavily than that of client device 400. Embodiments may prioritize classes or objects for translocation based on comparison of performance factors and other data collected on both client device 400 and computing node 406. A cost-benefit or optimization approach may be utilized to determine whether or not to adjust the translocation score of a particular class or object, or to determine how aggressively to select classes or objects for translocation.

Interactions between translocated objects on computing node 406 and non-translocated objects on client device 400 may be categorized as stateless or stateful interactions. A stateless interaction may be described as one that has no meaningful side effects, such as a method whose execution has no effect other than to return a value. A stateful interaction, on the other hand, is one which produces side effects that are associated with a need for synchronization.

In FIG. 4, a stateless interaction is depicted by invocation 412 of a stateless method, which may be followed by reply 414. The reply 414 may comprise the results of executing the stateless methods. This may include, for example, the result of a computation performed on computing node 406 using parameters supplied by invocation 412.

A stateful interaction may also comprise an invocation 416 followed by a reply 418. However, because the associated method is stateful, embodiments may perform synchronization 420 to reconcile state changes made on computing node 406 with data on client device 400 and vice versa. Embodiments may bundle data pertaining to synchronization 420 with invocation 416 and reply 418 in order to reduce the number of network round trips made to perform the operation associated with the stateful method.

In some cases, a method may not alter state information but may nevertheless be dependent on a state. In some embodiments, this type of method may be treated as a stateful method. In others, it may be treated as a stateless method. Some embodiments may transfer member variable and other state information with invocation 412.

Categorization of interactions as being stateful or stateless may influence scoring of classes or objects for translocation. In various cases and embodiments, stateless interactions are preferred for translocation. An interaction may be classified as stateful or stateless based on static analysis of an application program. Some embodiments may also use dynamic analysis in addition to or instead of static analysis.

Figure 5:
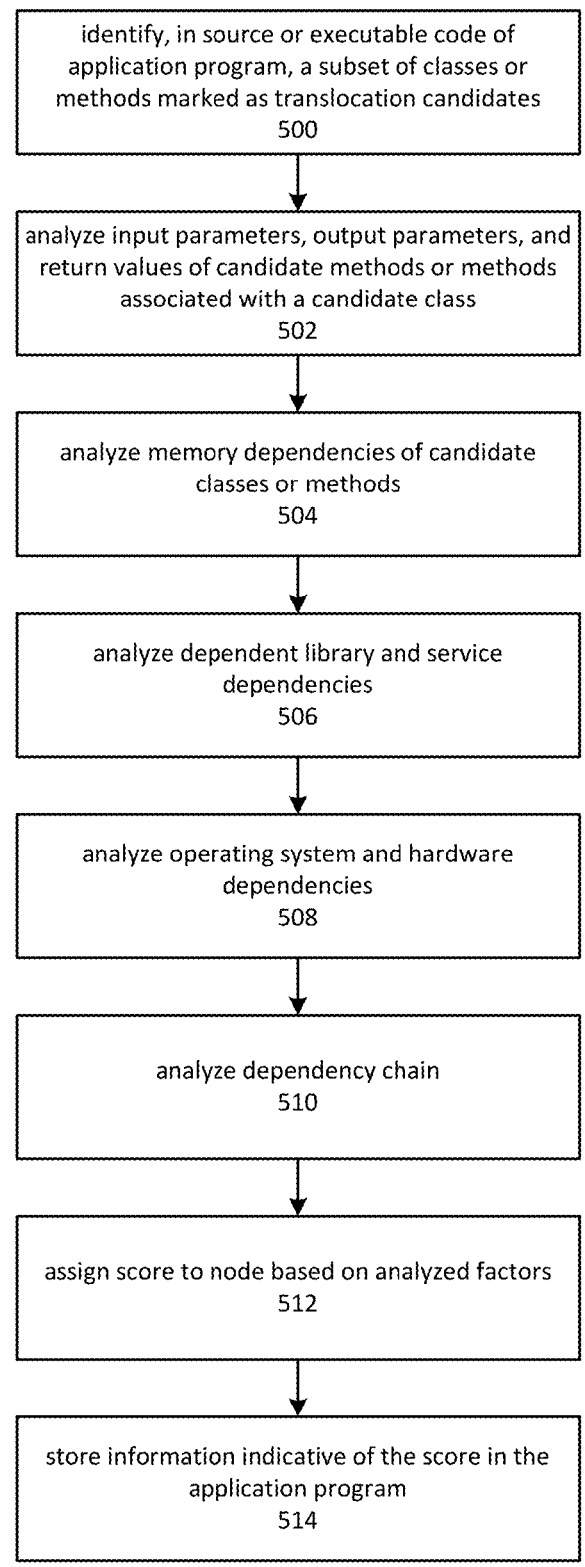
FIG. 5 is a flowchart depicting static analysis of an application program for determining suitability of segments of an application program for translocation.

FIG. 5 is a flowchart depicting static analysis of an application program for determining suitability for translocation of segments of an application program. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Operation 500 depicts an embodiment identifying a subset of the classes or methods in an application program that may be considered to be candidates for translocation. The identification may be based on the use of attributes, annotations or other such mechanisms employed by a developer to mark candidate classes or methods. Embodiments may employ techniques such as parsing source code or employing reflection techniques on compiled code to identify classes or methods that have been marked. Some embodiments may scan source code or compiled code to directly infer suitability for translocation based on predicted behavior of the code, without the use of mechanisms such as annotations or attributes.

Operation 502 depicts analyzing input and output characteristics of candidate methods or methods associated with a candidate class. These characteristics may include the type of parameters supplied to a method as input, or returned as an output parameter or as a return value. Complex parameter types, such as those defined using something other than a fundamental type, may weigh against translocation, while fundamental types, such as integers, may suggest the opposite. Similarly, large parameters may weigh against translocation while small parameters weigh in favor.

Operation 504 depicts analyzing memory dependencies of a candidate class. Embodiments may identify references made by methods of the candidate class to method parameters, member variables (potentially including both static and instance variables), global variables and so forth. Embodiments may analyze various factors related to memory access to determine suitability for translocation. For example, embodiments may analyze dependencies between member variables and other methods, including a candidate method. A high degree of dependence may suggest a lower priority for translocation or an unsuitability for translocation, while a low degree of dependence may suggest the opposite. The amount of data referenced may also be considered. Another possible factor, among many, is whether the dependency is read-only or involves both read and write operations.

Operation 506 depicts embodiments analyzing dependencies external to the application program, such as dynamic link libraries, daemon processes, web services and so forth. The availability of these types of dependencies at the translocation destination may weigh in favor of translocation in some cases when the external dependency is not stateless—it may be desirable to avoid state synchronization of external dependencies running on a client device and a remote computing node. On the other hand, when a dependency such as a stateless web service is running at the translocation destination, performance enhancements may be gained in some instances by translocating the methods that invoke it. Another related factor is whether or not a compatible version of the service is present at the translocation destination.

At operation 508, embodiments may analyze operation system and hardware dependencies. A variety of approaches may be used, alone or in combination. Embodiments may analyze suitability of a method for translocation based on the factors noted above. Candidate methods that invoke operating system or hardware dependencies may be scored based on the category in which the operating system or hardware dependency falls. It will be appreciated, however, that the following categorization is intended to be illustrative, and should not be viewed as limiting the scope of the present disclosure. A first category may involve operating system functions for which translocation is always unsuitable. This might pertain to memory management functions, power-off and so forth. A second category involves hardware and hardware access functions for which translocation is unsuitable except for special circumstances. A camera is one example of this type of device, since only the client device's camera would be able to capture a picture in that camera's field of view. However, special circumstances, such as testing or simulation, may suggest that functions invoking a camera could be translocated. A third category may involve calls that may be translocated. One example is calls involving the invocation of a graphics processor, which might in some cases and embodiments benefit from translocation. This might be the case, for example, when a remote computing node has a more powerful graphics processing unit than a client device. A fourth category may involve calls that are intended to be translocated. This category might include calls to services pertaining to a remotely hosted storage service.

Operation 510 depicts an embodiment analyzing a chain of dependencies of a candidate for translocation. Embodiments may analyze a chain of dependencies with respect to a number of factors. One of these may involve the depth of the dependency chain. A candidate method having no dependencies, or a small number of dependencies, may be more suited to translocation than a method having a large number of dependencies. Another factor may involve what can be described as the severability of the dependency chain. This may involve points in the chain that may have suitable boundaries for translocation, where suitability may be determined based on factors including, but not limited to, the frequency with which the boundary is expected to be cross during execution of the candidate method, or the amount of data expected to be transferred. A candidate method that has, in its chain of dependencies, factors that weigh against translocation may nevertheless be a good overall candidate for translocation if the chain of dependencies has a good severability point.

Based on factors such as those depicted as being analyzed in operations 502-510, embodiments may assign a score to a candidate class or method, as depicted by operation 512. The score may indicate the class or method's suitability for translocation or its priority for translocation. Note that for the purposes of analyses, the characteristics of a class may be derived from the characteristics of the class's methods. Embodiments may assign a translocation score to a class based on the suitability for translocation of the class's methods.

At operation 514, embodiments may store information indicative of the score in the application program or other code under analysis. Embodiments may also store the information in an external file or files. The score information may be utilized at runtime by a scheduler or other component that may analyze the information to select classes and methods for translocation.

Figure 6:
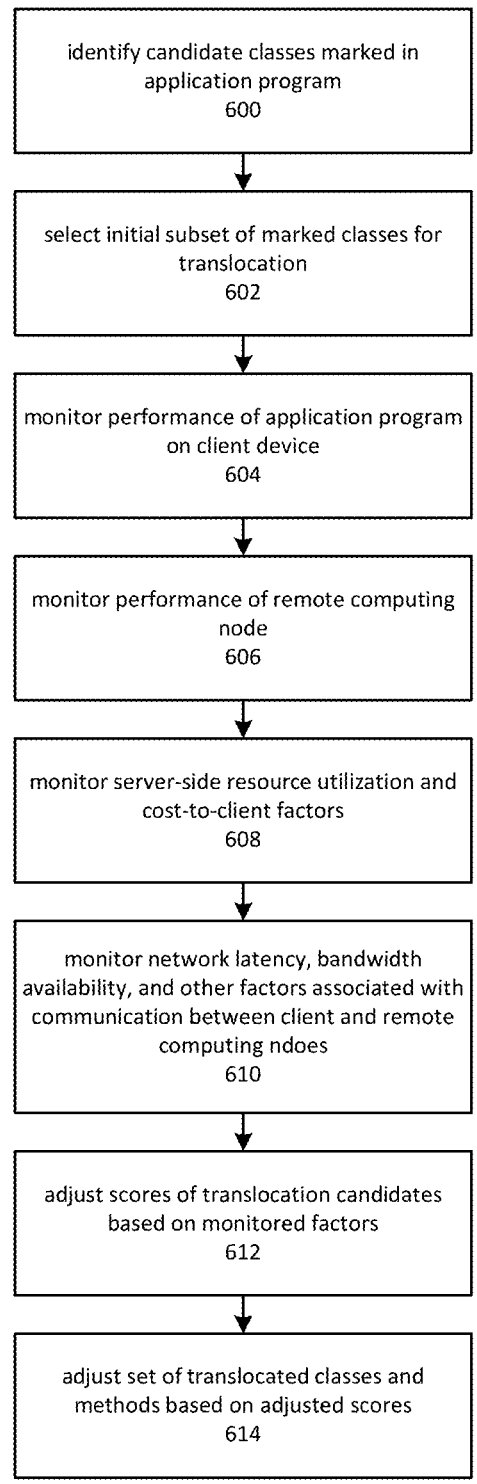
FIG. 6 is a flowchart depicting an embodiment for selecting classes or methods for translocation based on assigned scores and scores adjusted based on monitoring the execution of an application program.

FIG. 6 is a flowchart depicting an embodiment for selecting classes for translocation based on assigned scores and scores adjusted based on monitoring execution of an application program. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

As depicted by operation 600, embodiments may identify candidate classes and methods that have been marked in an application program. A scheduler component may receive information indicative of a program beginning to execute, and in response initiate an inspection of the application program code or related information in order to determine a set of classes or methods marked as candidates for translocation. Embodiments may also determine, through inspection, scores assigned to the candidate classes and methods as a result of static analysis.

Operation 602 depicts selecting an initial subset of the candidate classes for translocation. Embodiments may determine an initial degree or amount of translocation to perform. This may involve receiving an indication of how aggressive a scheduler module should be in translocating classes. For example, in various embodiments information may be received by a scheduler module that indicates a threshold score for translocating classes or methods. In some embodiments, a threshold score may be indicated by a developer and included as information embedded in an application program. In other embodiments, a threshold score may be determined by factors including, but not limited to, the client device on which an application program is running, network availability at the time of startup, the availability of remote computing resources and so forth. Another factor that may be utilized, in various embodiments, is potential for power utilization. Embodiments may determine that certain methods, system features, program constructs and so forth are likely to utilize an amount of power that is above a threshold level. These may be scored to favor translocation on a power-sensitive device such as a mobile phone. In some embodiments, scoring may be conditional based on factors such as the device on which code is to be run, or based on various conditions that might occur at runtime. Battery level is one example.

Embodiments may monitor various factors related to the operation of an application program and, using the information collected, modify the set of classes chosen for translocation. Operation 604 depicts monitoring performance of the application on the client device. This may include monitoring the overall performance of the client device. Aspects of performance may include the execution times for various features of an application program or the client device's operating system. It may also include other metrics, such as memory utilization, CPU utilization and so on. Power utilization may be considered, as well as battery level. In some embodiments, various threshold values may be defined for use as a basis of comparison. These threshold values might be associated with candidate classes or methods through the use of attributes or annotations. The threshold values might also be defined as parameters global to the application program. Embodiments might employ various formulas or heuristics to combine client device and application program performance metrics with other factors to determine if a candidate class or method should be translocated.

Operation 606 depicts monitoring performance of a remote computing node on which translocated classes or methods are executing or may be executed. Embodiments may employ multiple remote computing nodes. Monitoring of performance of a remote computing node may consider metrics such as execution times, CPU utilization, memory utilization and so forth. This may include metrics directly attributable to translocated classes and methods, such as the execution time of a translocated method. Overall system performance may be considered.

In some embodiments, classes and methods may be translocated to a remote computing node that is provided for the use of a customer in exchange for a fee. In such cases, cost to the client may be based on the degree to which a remote computing node is utilized on behalf of a customer. Operation 608 depicts monitoring utilization or consumption of server-side resources and other factors that may influence the cost to the client for allowing translocated classes or methods to run on a hosted remote computing node. For example, an embodiment might compare a rate of utilization on the remote computing node to a budgeted rate of utilization. If actual utilization exceeds the budgeted utilization, embodiments might determine to return one or more translocated classes to the client device, so that actual utilization is equal or less than budgeted utilization. Various other cost factors may be considered, such as charges that might be imposed on a user for the use of network bandwidth. In general terms, costs may be evaluated in terms of computing resources usable to execute a translocated function and the cost to an end user, publisher or provider for the use of those resources.

Operation 610 depicts monitoring availability, latency, available bandwidth and other factors associated with communication between a client device and a remote computing node. The availability or lack thereof may be a controlling factor in determining whether to translocate a class or method. Embodiments may monitor for transitions between availability and unavailability. When a network becomes unavailable, embodiments may relocate any translocated classes back to a client device until a network becomes available.

Network latency may be analyzed and considered by various embodiments in determining to translocate a class or method, or to determine to relocate a translocated class back to a corresponding client device. Embodiments may analyze network latency with respect to various other factors, such as the chattiness of a translocation boundary, or in other words the frequency of interaction between a non-translocated portion of an application program and a translocated portion. A similar approach may be adopted with respect to network bandwidth. Note that the techniques described herein may allow for dynamic adaptation to network conditions. For example, when operating on a high-bandwidth network that has high latency, methods with chunky interfaces may be selected for translocation. On the other hand, when a low-bandwidth, low-latency network is in use, methods with chatty interfaces may be selected.

The various factors described in operations 604 to 610 may be employed to adjust score values associated with translocation candidates. In some embodiments, this may comprise traversing a dependency tree of a candidate class and adjusting translocation scores of dependencies in the tree, and recalculating the overall translocation score of the candidate class based on the scores of its dependents. For an entry in the chain of dependencies, the adjustment to the score may be influenced by information indicative of how certain performance factors may influence the score. For example, during static analysis of an application program, embodiments might determine that certain methods are susceptible to high-latency networks. These methods might have negative score adjustments greater in magnitude that other methods in response to monitoring high-latency network conditions. Operation 612 depicts adjusting scores based on this type of technique, or other similar analysis techniques.

Embodiments may transmit performance information between a client device and one or more remote computing nodes or directly between computing nodes. In some embodiments, performance information may be aggregated across multiple execution instances. Historical performance information may be shared and utilized to adjust initial translocation scores.

Operation 614 depicts an embodiment adjusting a set of translocated classes and methods based on adjusted scores. In various embodiments, scores may be treated as a priority for translocation. A scheduler module might, for example, determine to translocate classes from a client device to a remote computing node until the remote computing node is at a desired utilization level, at which point additional classes or methods may not be translocated until utilization decreases. Alternatively, a scheduling module might determine to translocate classes from a client device to a remote computing device, or to one or more remote computing devices, until performance of the client device improves above a threshold level. In either of these cases, embodiments might translocate classes based on scores assigned to candidate classes and methods. The highest score, for example, might be translocated first, and then the second highest score and so on. A reverse process might be employed to reduce the number of translocated classes and methods, for example by first removing translocated classes having the lowest score among translocated classes, then the next lowest and so on.

In some embodiments, translocation scores may be calculated with respect to performance factors relevant to potential translocation locations, including the client device. Embodiments may compare scores and determine to translocate a class or method based on the highest score.

Figure 7:
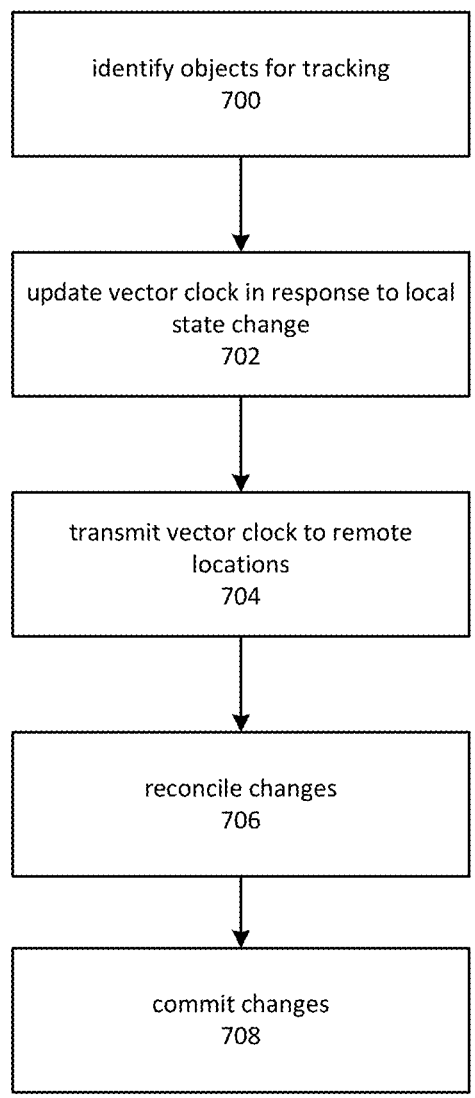
FIG. 7 is a flowchart depicting object-version tracking and commitment models for objects in a distributed application.

Interaction between an application program executing on a client and a translocated class or method may involve synchronization of associated objects. This may, for example, include the synchronization of data indicative of the value of member variables accessed by translocated methods. FIG. 7 is a flowchart depicting object-version tracking and commitment models for objects in a distributed application. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel.

Operation 700 depicts identifying objects for tracking. A scheduling module may identify translocated objects and track changes to the objects. This may comprise determining which translocated methods associated with a translocated object may affect the state of the object, for example by identifying which methods write to member variables. Methods that perform read-only operations on member variables or other shared state may also be tracked. Embodiments may prioritize a method or object for translocation based on state-related dependencies associated with the method or object. Embodiments may employ this approach to reduce the number of objects whose state is to be tracked.

Operation 702 depicts updating a vector clock in response to a state change made to a local copy of a translocated object. A vector clock may represent a cumulative list of changes made or known locally. After being updated to represent a local change, the vector clock may be transmitted to a client device or remote computing node to indicate that the object has changed. This is depicted by operation 704.

At operation 706, a recipient of the updated vector clock may apply the information to determine if the recipient's copy of the data should be updated to reflect the change. A received copy of the vector clock may be compared to a local copy in order to determine which changes have been applied to the recipient's copy of the data.

Operation 708 depicts committing changes made to copies of the data associated with a translocated object. This may, for example, involve a client device and a remote computing node making changes made to an object permanent. This may reflect the client device and remote computing node reaching an agreement that each possesses an accurate version of the data.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 8:
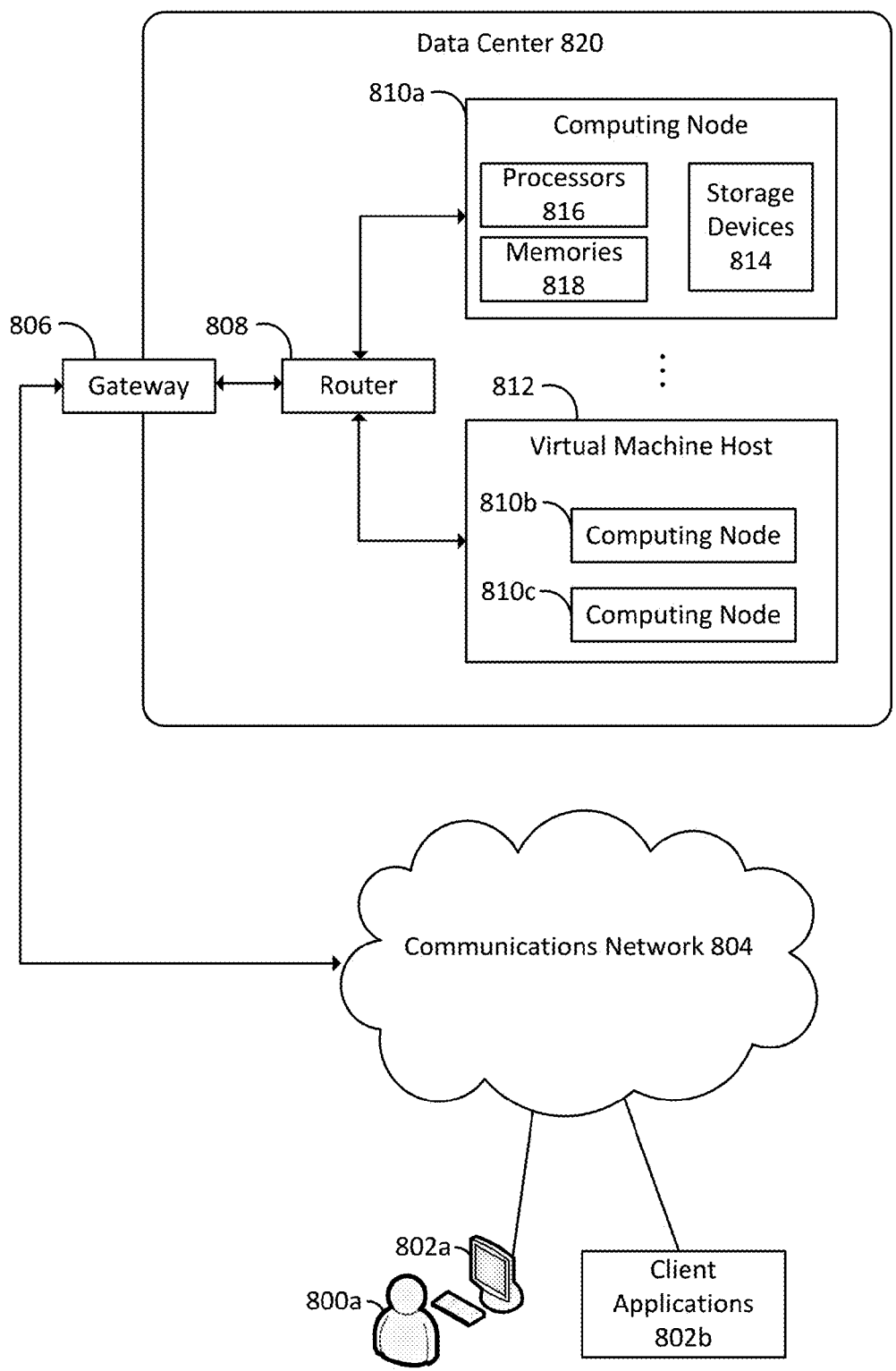
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b and 810c within a data center 820. Alternatively, client applications 802b may communicate without user intervention. Communications network 804 may comprise any combination of communications technology, including the Internet, wired and wireless local area networks, fiber optic networks, satellite communications and so forth. Any number of networking protocols may be employed.

Communication with processes executing on the computing nodes 810a, 810b and 810c, operating within data center 820, may be provided via gateway 806 and router 808. Numerous other network configurations may also be employed. Although not explicitly depicted in FIG. 8, various authentication mechanisms, web service layers, business objects or other intermediate layers may be provided to mediate communication with the processes executing on computing nodes 810a, 810b and 810c. Some of these intermediate layers may themselves comprise processes executing on one or more of the computing nodes. Computing nodes 810a, 810b and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818 and one or more storage devices 814. Processes on computing node 810a may execute in conjunction with an operating system or alternatively may execute as a bare-metal process that directly interacts with physical resources, such as processors 816, memories 818 or storage devices 814.

Computing nodes 810b and 810c are depicted as operating on virtual machine host 812, which may provide shared access to various physical resources, such as physical processors, memory and storage devices. Any number of virtualization mechanisms might be employed to host the computing nodes.

The various computing nodes depicted in FIG. 8 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
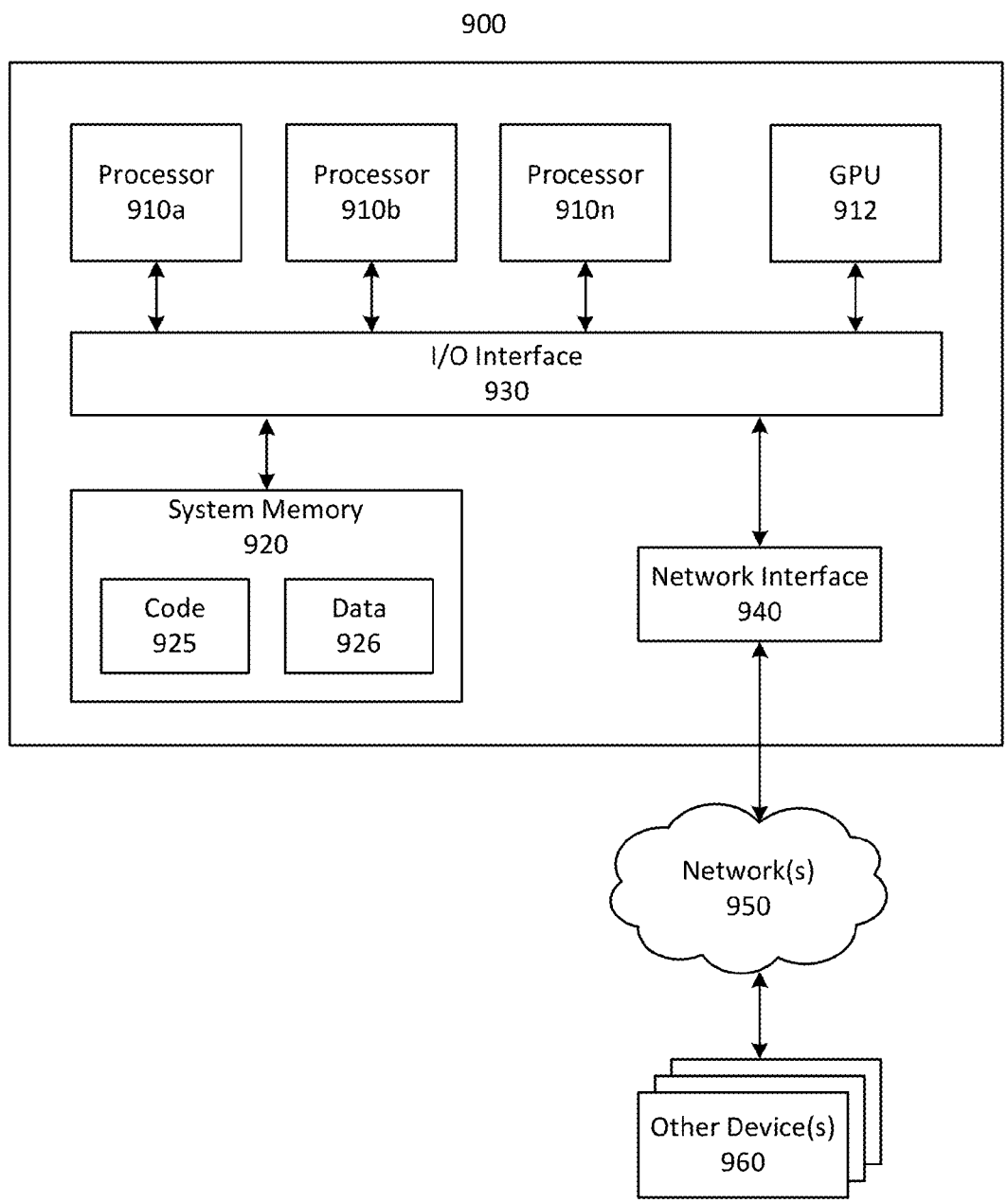
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b and/or 910n (which may be referred herein singularly as a processor 910 or in the plural as the processors 910) coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC or MIPS ISAs or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between processor 910, system memory 920 and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A computing node, which may be referred to also as a compute node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as computing nodes or as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth.

Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method executed by a first computing node comprising a processor, comprising:
    initiating execution of a program on the first computing node, the program comprising a plurality of functions including a first function;
    processing information indicative of executing the first function on a second computing node remote to the first computing node, the information indicative of a priority for executing the first function on the second computing node instead of the first computing node, the priority relative to the priority for executing other functions of the plurality of functions on the second computing node;
    determining to execute the first function on the second computing node, the determining is based at least in part on the information indicative of a priority for executing the first function on the second computing node and based at least in part on information indicative of a capability of the first computing node to execute the first function;
    causing the first function to be executed on the second computing node;
    determining to execute the first function on the first computing node based at least in part on receiving additional information indicative of the capability of the second computing node to execute the first function;
    synchronizing data maintained on the first computing node with a copy of the data maintained on the second computing node, wherein the data is referenced during execution of the first function; and
    causing the first function to be executed on the first computing node.

2. The method of claim 1, further comprising:
    determining to execute a second function of the program on the second computing node, the determining based at least in part on monitoring a performance characteristic of the first computing node.

3. The method of claim 1, wherein the information indicative of executing the first function on the second computing node comprises a value indicative of state characteristics of the first function.

4. The method of claim 1, wherein the information indicative of executing the first function on the second computing node comprises a value indicative of device dependencies of the first function.

5. The method of claim 1, wherein the information indicative of executing the first function on the second computing node corresponds to an indication by a developer that the first function is a candidate for executing on the second computing node.

6. The method of claim 1, wherein the additional information corresponds to a change to a performance characteristic of at least one of the second computing node or a connection between the first computing node and the second computing node.

7. The method of claim 1, wherein the information indicative of a priority for executing the first function on the second computing node is a value calculated based at least in part on at least one of performance of the first computing node, performance of the second computing node, and network performance.

8. The method of claim 1, wherein the information indicative of a priority for executing the first function on the second computing node is a value calculated based at least in part on a cost to at least one of a publisher or a user of the program, the cost based at least in part computing resources usable to execute the first function.

9. A computing device comprising:
    a network interface for communicatively coupling the computing device to a remote computing node;
    one or more memories having stored thereon computer readable instructions that, upon execution by the computing device, cause the computing device at least to:
    initiate execution of an application program on the computing device, the application program comprising a plurality of functions including a first function, wherein a first copy of the application program is stored on the computing device and a second copy of the application program is stored on the remote computing node;
    select the first function of the plurality of functions that comprise the application program for execution on the remote computing node instead of the computing device, the selection based at least in part on information indicative of a priority for executing the first function on the remote computing node instead of the computing device being higher than a second priority for executing a second function of the plurality of functions on the remote computing node instead of the computing device, and based at least in part on information indicative of a capability of the computing device to execute the first function;
    synchronize data maintained on the computing device with a copy of the data maintained on the remote computing device, wherein the data is referenced during execution of the first function; and
    receive, from the remote computing node, information indicative of a result of executing the first function on the remote computing node.

10. The computing device of claim 9, further comprising one or more memories having stored thereon computer readable instructions that, upon execution by the computing device, cause the computing device at least to:
    recalculate the priority for executing the first function on the remote computing node, the recalculating based at least in part on the information indicative of the capability of the computing device; and
    determine to execute a second function of the application program on the remote computing node, the determining based at least in part on the recalculated priority for executing the first function on the remote computing node.

11. The computing device of claim 9, further comprising one or more memories having stored thereon computer readable instructions that, upon execution by the one or more computing devices, cause the computing device at least to:
  determine to execute the first function on the computing device, based at least in part on information indicative of a capability of the remote computing node to execute the first function.

12. The computing device of claim 9, wherein the information indicative of a priority for executing the first function on the computing node remote to the computing device is based at least in part on a hardware device dependency of the first function.

13. A non-transitory computer-readable storage medium having stored thereon instructions that, upon execution by one or more computing devices, cause the one or more computing devices at least to:
  process information corresponding to a first function of a program comprising a plurality of functions, the program executing on a first computing node, the information indicative of a priority, with respect to a second function, for executing the first function on a second computing node;
  determine a capability of the first computing node to execute the first function;
  determine to execute the first function on the second computing node, the determining based at least in part on the priority for executing the first function on the second computing node and the capability of the first computing node to execute the first function;
  synchronize data maintained on the first computing node with a copy of the data maintained on the second computing node, wherein the data is referenced during execution of the first function; and
  cause the first function to be executed on the second computing node.

14. The non-transitory computer-readable storage medium of claim 13, comprising further instructions that, upon execution by the one or more computing devices, cause the one or more computing devices to at least:
  cause data corresponding to parameters of the first function to be transmitted from the first computing node to the second computing node; and
  cause data corresponding to a result of executing the first function to be transmitted from the second computing node to the first computing node.

15. The non-transitory computer-readable storage medium of claim 13, comprising further instructions that, upon execution by the one or more computing devices, cause the one or more computing devices to at least:
  cause the first function to be executed on the first computing node based at least in part on comparing the capability of the first computing node to execute the first function with a capability of the second computing node to execute the first function.

16. The non-transitory computer-readable storage medium of claim 13, comprising further instructions that, upon execution by the one or more computing devices, cause the one or more computing devices to at least:
  determine to execute an additional function of the program on the second computing node, the determining based at least in part on monitoring a performance characteristic of the first computing node.

17. The non-transitory computer-readable storage medium of claim 13, wherein suitability for executing the first function on the second computing node is based at least in part on at least one of an annotation or attribute.

18. The non-transitory computer-readable storage medium of claim 13, wherein the second computing node comprises a virtual machine compatible with an execution environment of the first computing node.

* * * * *